United States Patent [19]
Terranova

[11] Patent Number: 6,120,088
[45] Date of Patent: Sep. 19, 2000

[54] CAR ARM RESTOR

[76] Inventor: Robert C Terranova, 1707 N. Gardiner Dr., Bay Shore, N.Y. 11706

[21] Appl. No.: 08/791,864
[22] Filed: Jan. 31, 1997
[51] Int. Cl.⁷ ........................................................ B60J 9/00
[52] U.S. Cl. ...................... 296/153; 248/118; 297/411.22; 108/46; 296/37.13
[58] Field of Search ................................ 296/153, 37.13; 248/118, 311.2; 297/411.22; 108/46

[56] References Cited

U.S. PATENT DOCUMENTS

| | | | |
|---|---|---|---|
| 1,374,907 | 4/1921 | Cofrode | 296/153 |
| 4,165,898 | 8/1979 | Janz et al. | 296/153 |
| 4,453,760 | 6/1984 | Hira | 296/153 X |
| 4,592,584 | 6/1986 | White, Jr. | 296/153 |
| 4,863,134 | 9/1989 | Young et al. | 248/118 |
| 4,877,284 | 10/1989 | Doane | 296/153 |
| 5,232,190 | 8/1993 | Gould | 248/118 |

*Primary Examiner*—D. Glenn Dayoan
*Assistant Examiner*—Jason Morrow

[57] ABSTRACT

A vehicle utilized human arm rest, which incorporates functional aspects which are adjustable, ambidextrous and portable and rests upon a vehicle door/window panel. The arm rest sits upon the sill of the door panel and can be adjustably angled and is affixed by means of a slim linear protrusion that extends in between the vehicles window and weather stripping of the window/door panel opening. The resting platform extends inwardly towards the interior of the vehicle. The window can be left in any desired position. The arm rest's top main body incorporates a recessed cushioned impression of a human forearm. Those who wish to rest their elbows and/or entire forearms may do so in multiple fashions. The arm rest recessed forearm impression is designed with a forward facing and sideward facing openings that allows for partial or full placement of the forearm. The device has two adjustable knobs and pads which are positioned in perpendicular fashion, near the front and rear of the main body unit. These adjustment devices face the interior of the vehicle and the door/window panel, thus allowing for vertical/angular adjustment and placement of the device. The device is of a durable and flexible material. The device has functional enhancement features such as a cup holding device with a cover to prevent splashing along with a tissue dispenser located within the front/interior facing area of the main body.

3 Claims, 4 Drawing Sheets

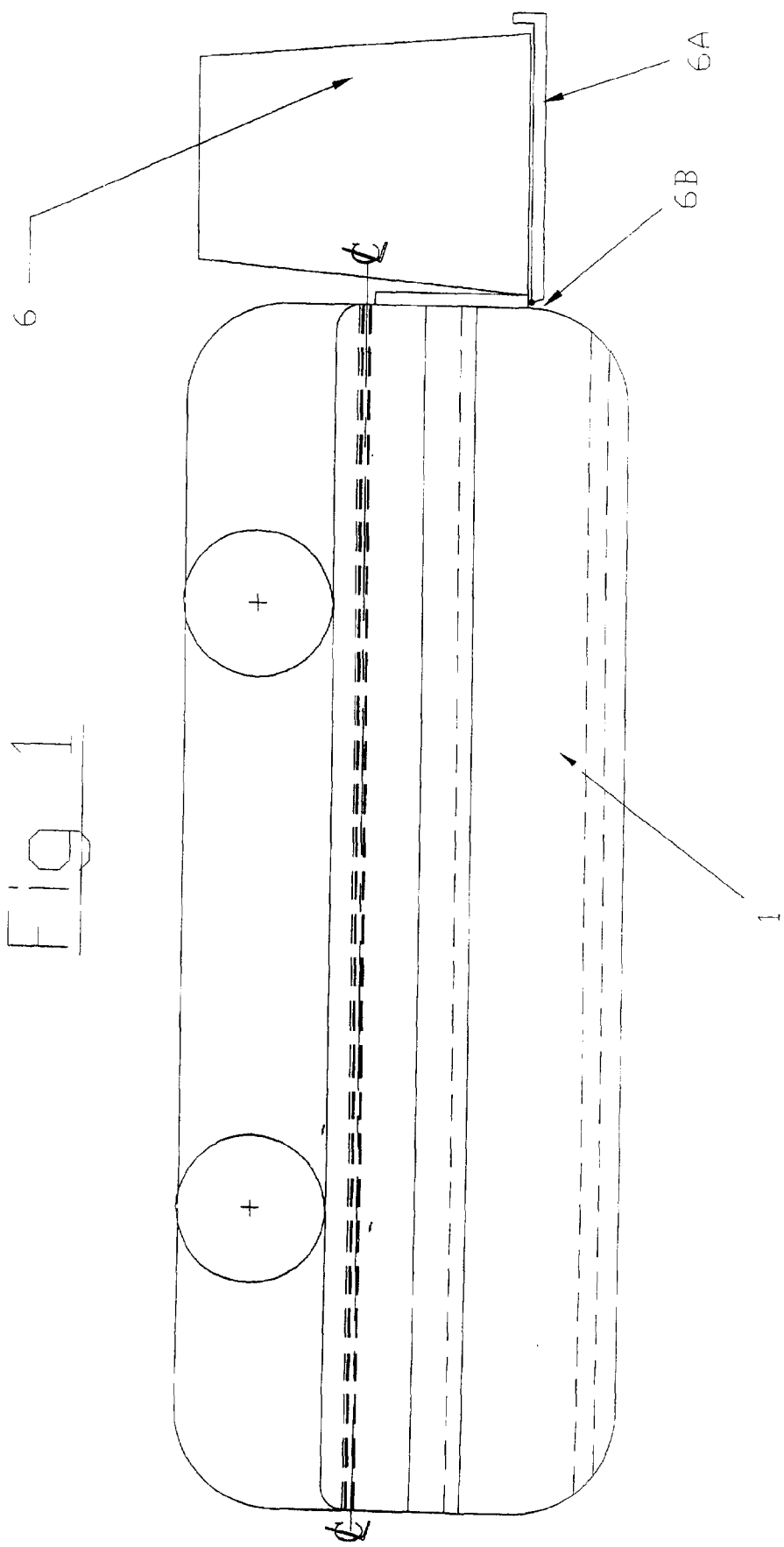

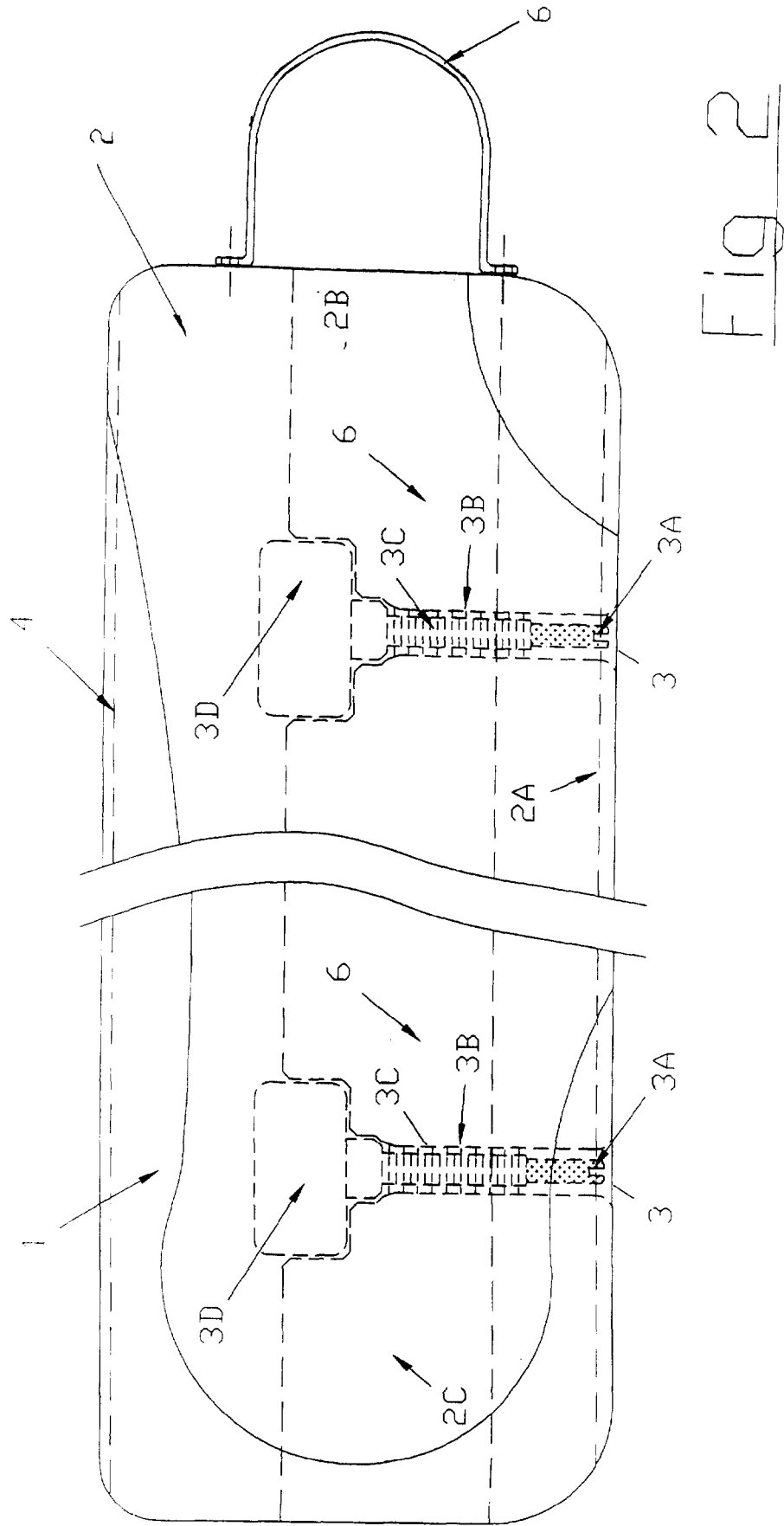

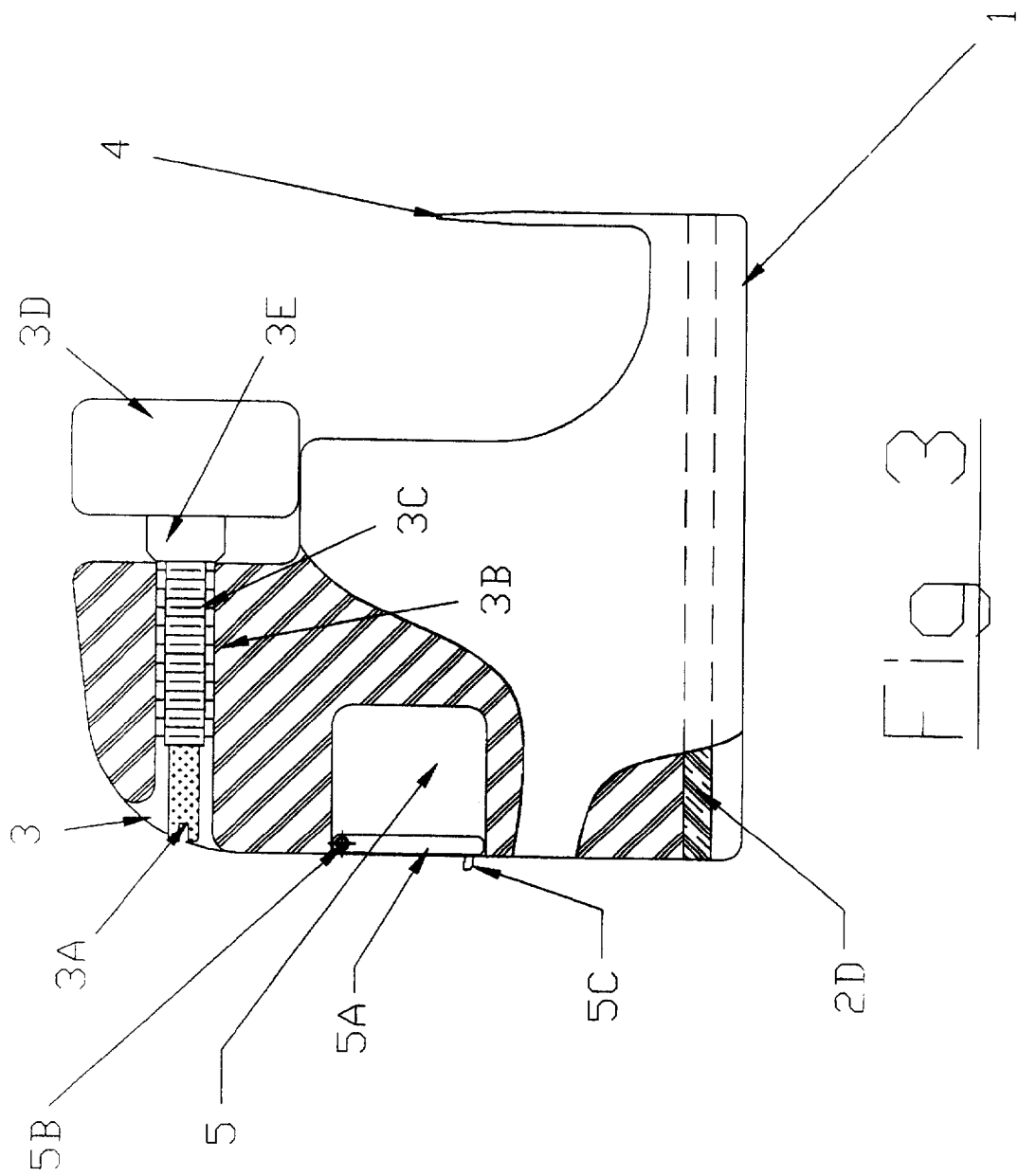

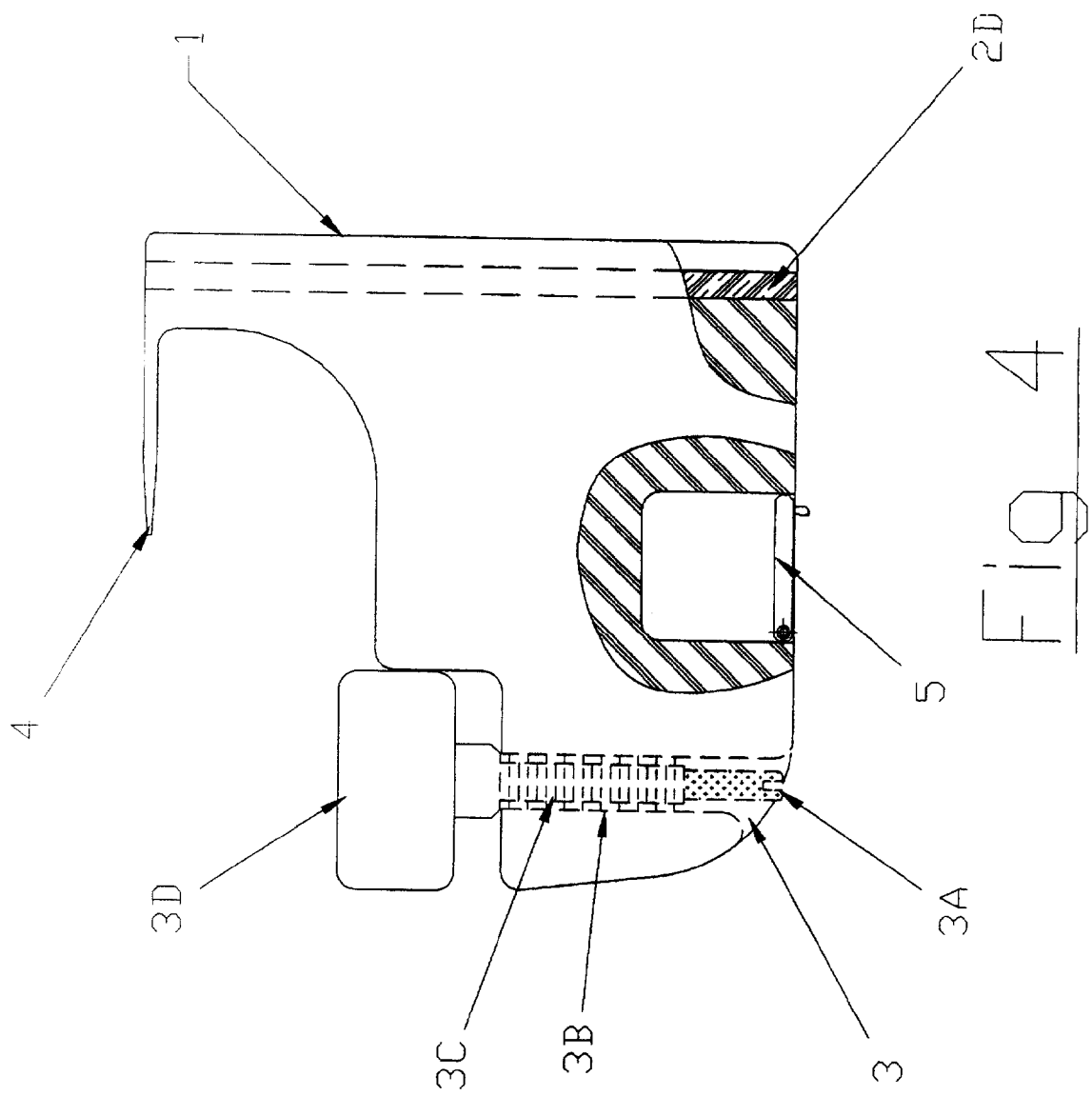

CAR ARM RESTOR

BACKGROUND—FIELD Of THE INVENTION

1. Field of the Invention

The invention is relevant to an arm resting device that can level itself against the interior of a vehicle's individually shaped door/window panel, thus allowing for simplified use in any vehicle.

BACKGROUND—DESCRIPTION OF PRIOR ART

2. Description of Prior/Relative Art

The U.S. Pat. No. 5,320,401 discloses a vehicle arm rest that latches to the underside of a door panel between the window and panel weather stripping by use of a strap with projections which leans against the interior of a door panel. Other similar devices have been proposed with varied attaching methods. There are apparent drawbacks to these type of devices. The majority of vehicles are excluded from the use of such devices. The designs of the prior art do not accommodate a variety of vehicles because they fail to provide means to properly flush or level their frames against the interior door/window panel of the vehicles due to the vast variation in contours, thickness and geometric shapes of the panels. The properties of these other devices, claiming to insert their elements in between the window and stripping, limit their applicability. There exist prior art designs only to be used when the window is fully opened and can only be attached in this position. Others have elaborated from this and devised a device that can be attached to the interior door panel and used with the window in a raised or lowered position.

While many attempts have been devised to incorporate such a device with non restrictive conditions, many lack the properties to rest or position an arm on the sill of a vehicle with the choice of having the window raised or lowered. While each of those prior art designs may be used as an arm car rest, each lack the unique design configuration of the present invention.

OBJECTS AND ADVANTAGES

Accordingly, several objects and advantages of my invention are that the invention is used for the commodious resting of a persons arm within most vehicles which is easily mounted and dismounted to all vehicles, adjustable at varied angles, portable, and can be manufactured with readily available materials at an economical cost. Still further objects and advantages will become apparent from a consideration of the ensuing description and accompanying drawings.

BRIEF DESCRIPTION OF THE DRAWINGS

FIG. 1 is a Side Plan view of the "Arm Restor", that which faces the inner door panel.

FIG. 2 is a Top Plan view of the "Arm Restor".

FIG. 3 & 4 are Left Side Plan Views of FIG. 1 & 2 respectively with sectional and hidden views reflecting internal working mechanisms.

REFERENCE NUMERALS

Numerals
1) Main Body
2) Forearm recessed imprint
2a) Opening along the forearm recessed imprint
2b) Opening along the forearm recessed imprint
2c) Elbow resting area of the forearm recessed imprint
2d) The cushion of the forearm recessed imprint
2e) Additional opening along the forearm recessed imprint
3) Front underside
3a) Knurl adjustment thumb knob
3b) Threaded through hole of the knurl adjustment thumb knob
3c) Threaded knurl rod
3d) Adjustment pads of the knurl adjustments thumb knobs
3e) Pivotal ball bearings
4) Vertical support member
5) Tissue compartment
5a) Access door compartment of the tissue compartment
5b) The hinge of the tissue compartment access door
5c) The latchable access door of the tissue compartment
6) A cup holder
6a) A cover/Lid attached to the cup holder
6b) The hinge of the cover/lid

SUMMARY

Summary

The invention is relative to a functional device for the commodious arm resting of persons within most vehicles which provides easy mounting and dismounting to all vehicles, adjustability at varied angles, portability, and the ability to be manufactured with readily available materials at an economical cost. The Arm Restor solves various mounting problems such as different sizes and shapes of various door/window panels, foreign and domestic alike, along with the attachment and resting of an arm along the sill of the window with the window opened or closed. The Arm Restor provides adjustability at different angles, proper and secure fitting, ease of horizontal and vertical positioning, and comfortable accommodation and positioning of an arm. The distinct geometric design and shape, angle adjustment mechanisms, knobs and pads, vertical support member (frontal holding device), enhancement features, and unique arm impression provide the basis for overcoming these obstacles as opposed to other arm rests of the prior art. The ergonomic design and uniqueness of the cushioned molded arm impression not only gives a perfect and comfortable fit for any user but also the flexibility to position an arm in different fashions with comfort. The device furnishes organization by its functional enhancement features for all vehicle users. The VEHICLE ARM RESTOR provides an owner or passenger in the vehicle accessibility and convenience by providing a cup holder with a cover along with a tissue dispenser within the reach of an individual.

PREFERRED EMBODIMENT—DESCRIPTION

Description of Embodiment

FIGS. 1 and 2, shows the overall main body's geometric shape 1 which is 10–14 inches long by 4–5 inches wide and is made of a medium density composite. 2 is the forearm recessed imprint of the cushioned area which is 0.38 inches deep. The cushion itself, shown in a cross sectional view, is secured inside the recessed forearm resting area and shall be of a rubber lining substance conducive for the comfortable placement of the forearm. 2a and 2b are the openings along the arm imprint 2 for which an arm can be positioned or extended. 2a would be used for a diagonal resting position with the arm touching the steering wheel or limped over in a relaxed position. 2c is the resting position of the elbow. 2c is the elbow resting area whenever the arm is in a diagonal resting position or when the arm is in an upright position. The occupant does have a choice to move his or her forearm along the elongated cushioned imprint 2 in a linear fashion between 2c & 2b without having to dismount and relocate the arm rest along the sill of the window. The front underside 3 incorporates lateral adjustable screws, the knurl knobs 3a–3c, and the pads 3d which are directly situated beneath the cushioned area 2. The adjustable lateral screws lay 1.03 inches above the base of the underside. The knurl adjustment thumb knob 3a easily adjusts the pads 3d to the door panel. The knurl adjustment thumb knob 3a is easily turned with a finger to move the pads 3d out or in from the main body until the pads 3d are positioned to the door panel where the main body frame is secured and flushed properly when the Arm Restor is mounted. 3b is a threaded thru hole, incorporating the threaded knurl adjustment thumb knob 3a and the threaded knurl rod 3c allowing for lateral adjustment of Arm Restor main body 1. 3d is the rubber padding (pad) that is attached to the end of the knurl adjustment thumb knob 3a and retracts or extends when the adjustable thumb knob 3a is turned to adjust the leveling and securing of the main body from the vehicle door panel.

The knurl adjustment thumb knob 3a is encased within the threaded thru holes 3b located in the main body 1 and attached to the a threaded knurl rod extension 3c of the adjustment pads 3d. A pivotal ball bearing 3e rest between the areas of 3d the rubber padding (pad) and the knurl adjustment thumb knob 3a. Such as to allow flexibility in movement to the pads when in contact with the surface area of the door panel, and thus controlling the overall lateral height & angular positioning of the complete assembly.

The under side of the main body 1 has a modularized thin durable plastic vertical support member device 4 along the underside perimeter of the main body 1 which has the dimensions of 12.0–14.0 long by 2.0–3.0 inches wide and is 0.015–0.040 inches thick. FIGS. 3 and 4 show side plan views of respective FIGS. 1 and 2 along with sectional and hidden line views reflecting the adjustment mechanisms with a tissue compartment 5 and access door 5A. FIGS. 3 and 4 reflect: the cushion 2d and recessed arm impression 2 being 0.12–0.38 recessed within the main body frame; lateral adjustment screws 3 (a–d) and knurl adjustment thumb knobs 3a. Outer main body 1 incorporating threaded thru hole(s) 3b, the threaded knurl rods 3c, adjustable pads 3d which are attached to the ends of the threaded knurl rod(s) and the vertical support member (frontal holding device) 4. FIG. 3 & 4 depicts a side profile of the arm restors main body 1. It reflects that part of the embodiment which faces toward the interior of the vehicle has a tissue dispenser 5. This compartment stores facial tissues for dispensing and it also incorporates a hinged 5b and latch-able access door 5c. The dimensions of this compartment can vary. The tissue dispenser compartment 5 incorporates an access door cover 5a that hinges to the main embodiment 1. In its normally closed position, it rests flush with the outer compartment 5 and latches to snap closed within the tissue compartment opening.

The dispenser cover 5a can open and close by depressing it with light pressure. A cup holder 6 is attached to the right side of FIG. 2 (main embodiment) with two screws and/or adhesive and is horizontally positioned. The cup holder is designed to hold a standard disposable foam type cup normally obtained from stores that provide a to-go service. Cover/lid 6a is attached to the top outer ridge of the cup holder 6 by a hinge 6b. The cup holder and lid/cover provide a preventive measure from spills occurring and a measure to capture spills by way of the cup enclosure. The cup holder has an interior rim to secure the beverage in a stationary manner and has an outer ridge rim to catch the beverage container so as to leave ample space to lift the container. The holder fits a number of standard sizes because of its taper.

Alternate Embodiments of the Invention

Various changes can be implemented in the preferred embodiment. The lateral adjustment screw 3 can have a spindle along the outer axis of the threaded knurl adjustment thumb knob casings, thus easing the random adjustment process in the areas of 3 and 3a. The spindle would be located on the underside of the main body 1 allowing for palm or fingertip control in positioning of the pads. 3d Another modification to the invention pertains to the enlarging of the main frame 1 by lengthening the area to extend the cushion impression area 2 where such area 2 would be slightly distanced from the sill. This procedure allows height adjustment for those individuals small in height that would require lower positioning of the cushioned impression. The cushioned impression area 2 would be extended further from the area of the main frame 1 that sits upon the sill. It can be adjusted at a lower level having two interlocking plastic rods located on the outer ends of the main body 1 where the two adjoining areas 1 & 2 meet. Each side would have a pair of rods that are gear driven positioned along their length to move relative to each other. Each pair of rods would have a latching device, similar to those found on baby proof cabinet locks, to hold the Arm Restor at the preferred height. This type of mechanism would enable the individual to make more extreme height adjustments.

Along the cushion impression area 2, an additional opening 2e can be incorporated. The additional opening 2e would augment the diagonal resting of an arm for the further extension over the sill/towards the window.

The schematics of the Car Arm Restor in reference to the exterior coatings (colors, coverings: (i.e. leather, fabric. . . ) can be multifaceted, giving a wide variety of choices to the individual patron.

While the Car Arm Restor provides in its scope the production abilities to provide and accompany a Car Arm Restor for either the left or right sides of a vehicles door panel, future developments as to the layout configurations can be configured to provide a dual faced Car Arm Restor that can be used for either the left side door panel and/or the right side door panel.

Other considerations can be related to an underlying base frame where as the embodiment of the Arm Restor sits upon and can easily move linear/laterally (forward and back) along the underlying base frame eliminating the need to remove and reposition the entire device at a particular destination point on the door panel.

A future consideration of providing a permanent standard option within all vehicles of having Arm Restors as an integral part of the door panels, manufactured and installed by the individual car manufacturing companies. Manufacturers whom are proficient in design development will implement their skills for the consideration of any alternate embodiment changes.

PREFERRED EMBODIMENTS—OPERATION

The car Arm Restor is affixed by means of a slim linear protrusion that extends in between the vehicles window and weather stripping of the window/door panel opening. In most instances the window should be lowered. The device incorporates two adjustable knobs and cushioned pads which are positioned in perpendicular fashion, near the front and rear of the main body unit. Adjustment knobs are turned for the extension of the pads to rest securely against inner door panel.

HOW I CAME ABOUT THE CONCEPT FOR MY INVENTION

The car arm restor is a cushioned device for the resting of your arm. Today, Americans exclusively utilize their automobiles as frequently if not more than frequently as part of a daily routine. We go shopping for groceries, apparel, school and even go driving leisurely when go about site-seeing, or to visit family members. We are constantly and consistently in our automobiles. We can earnestly say we live for our cars and live in them as well. We drive in most cases to relax in order to get to our desired destination. We all commonly do one thing, we rest our arm on the side door panel. We all seem to take part in this activity. It sort of our "relaxation period" and it gives us a feeling of comfort while on the road. There is one experience we all encounter when we place our arm on the door panel: There is not enough space to comfortably rest our arm and we experience elbow pain or circulation cut-off. One way we can eliminate the discomfort and enjoy the feeling of relaxation is to have the "Car Arm Restor".

CONCLUSIONS, RAMIFICATIONS, AND SCOPE

Accordingly, it can be seen that the invention is relative to a functional device for the commodious arm resting of persons within most vehicles which provides easy mounting and dismounting to all vehicles, adjustability at varied angles, portability, and the ability to be manufactured with readily available materials at an economical cost. The Arm Restor solves various mounting problems such as, different type sizes and shapes of various door/window panels, foreign and domestic alike, along with the attachment and resting of an arm along the sill of the window. The Arm Restor provides adjustability at different angles, proper and secure fitting, ease of horizontal and vertical positioning, and the comfortable fitting and positioning of an arm. The distinct geometric design and shape, angle adjustment mechanisms, knobs and pads, vertical support member (frontal holding device), enhancement features, and unique arm impression, provide the basis for overcoming these obstacle as opposed to other similar but not exact devices. The ergonomic design and uniqueness of the cushioned molded arm impression, not only gives a perfect and comfortable fit for any user but the flexibility to position your arm in different fashions with comfort. The device furnishes organization by its functional enhancement features for all vehicle users. The VEHICLE ARM RESTOR provides an owner or passenger in the vehicle perfect accessibility and convenience by incorporating these enhancements in the reach of the individual by providing a cup holder with cover along with a tissue dispenser. Although the description above contains many specifics, these should not be construed as limiting the scope of the invention but as merely providing illustrations of some of the presently preferred embodiments of this invention.

The claims to the inventions are.

1. A vehicle arm rest removably attached to the door window sill of a vehicle, adjustable to accommodate the shapes of door window sills of different vehicle types, comprising:

(a) a generally rectangular shaped frame having a top, an exterior side for facing the vehicle door sill, and an interior side for facing the passenger compartment of the vehicle, further comprised of:

(I) a cushioned impression within the top main frame, molded in the shape of an arm, with at least one cutout opening extending from the impression to a side of the arm rest;

(II) a flexible vertical support member that extends downwardly from the top of the frame and which slips in between the window and weather stripping of the vehicle door panel;

(III) at least one lateral adjustment device, integral with the main frame, including a knurled thumb adjustment rod attached to a pad, an adjustment knob, and a pivotal bearing located at the connection of the pad and knurled thumb adjustment rod;

(IV) through holes extending between the exterior side and the interior side of the arm rest encasing said knurled thumb adjustment rods of said at least one lateral adjustment device.

2. The device of claim 1 having a dispensing compartment consisting a recess and an access door with a hinged and latchable cover, centrally located within the interior side of the frame.

3. The device of claim 1 having a cup holder integral with said frame and having a generally cylindrically shaped base container with an open end and a closed end, an ridge around the open end of said base container, and a cup cover for covering said open end.

* * * * *